UNITED STATES PATENT OFFICE.

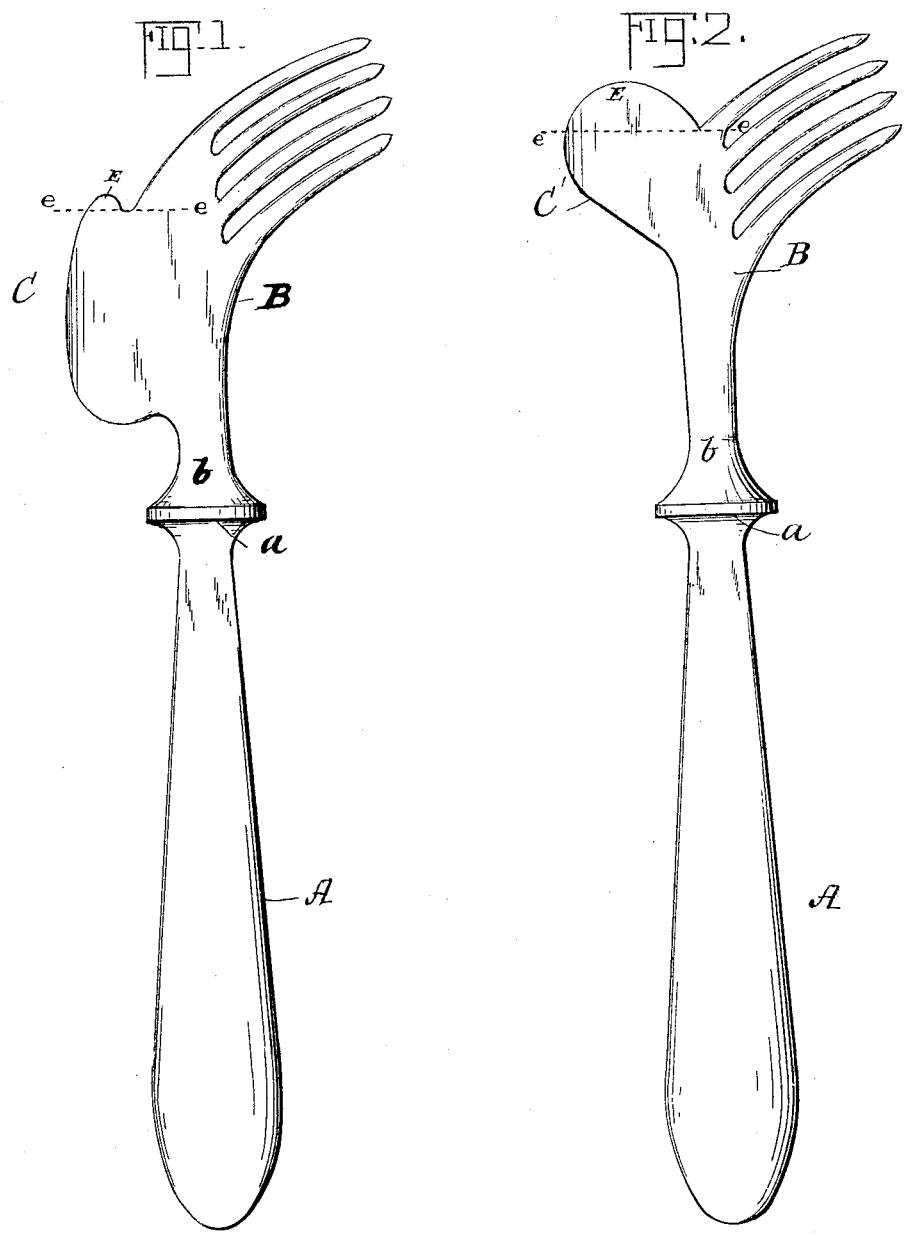

ARTHUR WATSON COX, OF BALLARD VALE, MASSACHUSETTS, ASSIGNOR TO ALICE J. COX, OF SAME PLACE.

TABLE-CUTLERY.

SPECIFICATION forming part of Letters Patent No. 498,627, dated May 30, 1893.

Application filed July 5, 1890. Serial No. 357,856. (No model.)

*To all whom it may concern:*

Be it known that I, ARTHUR WATSON COX, a citizen of the United States, residing at Ballard Vale, in the county of Essex and State of Massachusetts, have invented certain new and useful Improvements in Knives and Forks; and I do hereby declare the following to be a full, clear, and exact description of the invention, such as will enable others skilled in the art to which it appertains to make and use the same.

This invention relates to a combined knife and fork; and aims to provide an article of cutlery which can be conveniently manipulated by one hand for cutting food in small dishes and for removing the separated particles therefrom, and which will enable the user to secure a perfectly free, easy and certain grasp of the implement by either hand whether it be used either as a knife or fork.

The improvement consists, essentially, of a straight handle having a shank in line with the handle and having tines projected from the side of the shank in symmetrically curved lines to form the fork, and having a cutter projected from the other side of the shank in a diametrically opposite direction to the fork as hereinafter will more fully appear.

The improvement further consists in the novel features which hereinafter will be more particularly described and claimed, and which are shown in the annexed drawings, in which—

Figure 1 is a side view of a combined knife and fork embodying my invention. Fig. 2 is a similar view of a modified form.

The handle A is similar in each figure of the drawings, being straight and tapering from the rest $a$ toward the end where it is largest. The shank $b$ is in line with the handle and from one side thereof is projected in symmetrically curved lines the tines which compose the fork B as shown. The cutter is projected from the other edge of the shank in a diametrically opposite direction to the fork, and its front end projects forward of the line $e$ $e$ which is drawn at right angles to the shank from the point of contact of the cutter therewith to form what will be designated hereinafter as the front extension E of the cutter. In Fig. 1 this cutter C extends along on the shank $b$ some distance, whereas in Fig. 2, the cutter C' is located at the end of the shank directly opposite the fork and is semi-circular in form. The rest $a$ is provided for the finger or thumb to obtain a purchase on in the service of the implement, and to form a bolster to keep the fork and cutter from contact with the table linen.

The combined knife and fork can be used in either hand and admits of the separation of food in small deep dishes without elevating the handle to nearly a vertical position as is required by similar implements as generally constructed. It also permits food to be conveyed to the mouth in an easy, pleasant and graceful manner, in that the hand and arm do not have to describe so large a circle as with other knife forks, or with the ordinary table knife or fork.

For the purpose of economy and cleanliness the handle, rest, shank, tines and cutter are integrally formed. It will be observed that the front extension E of the cutter adds to the usefulness of the implement in that it facilitates the separation of tough substances by a shear or draw cut and in this particular is superior to similar prior devices.

Having thus described my invention, what I claim, and desire to secure by Letters Patent, is—

1. A combined knife and fork composed of a handle, a shank and a rest arranged between the handle and inner end of the shank, a series of fork tines projected laterally from one side of the outer end of the shank, and a curved cutter or blade projected from the opposite side of the said shank and in the same plane with the fork tines whereby the said tines and blade approximately balance each other the said blade or cutter having its front portion projected forward of the point of contact of its curved edge with the said shank, substantially as and for the purpose set forth.

2. A combined knife and fork consisting of a straight shank extended from a handle, a series of fork tines projected from one side of the outer end of said shank, a curved cutter or blade projected from the opposite side of said shank and in the same plane with the tines of the fork whereby the said fork is approximately balanced by the said cutter or blade, substantially as set forth.

In testimony whereof I affix my signature in presence of two witnesses.

ARTHUR WATSON COX.

Witnesses:
CHARLES H. MARLAND,
JAMES HILL.